US009822963B2

(12) United States Patent
Wang et al.

(10) Patent No.: US 9,822,963 B2
(45) Date of Patent: Nov. 21, 2017

(54) WIRELESSLY-CONTROLLED LIGHTING DEVICE WITH AUDIO PLAYING FUNCTION AND CONTROL METHOD THEREOF

(71) Applicant: SENGLED OPTOELECTRONICS CO., LTD., Tongxiang (CN)

(72) Inventors: Xia Wang, Tongxiang (CN); Chaoqun Sun, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 0 days.

(21) Appl. No.: 15/029,030

(22) PCT Filed: Apr. 29, 2015

(86) PCT No.: PCT/CN2015/077797
§ 371 (c)(1),
(2) Date: Apr. 13, 2016

(87) PCT Pub. No.: WO2016/050061
PCT Pub. Date: Apr. 7, 2016

(65) Prior Publication Data
US 2016/0258617 A1 Sep. 8, 2016

(30) Foreign Application Priority Data
Sep. 30, 2014 (CN) .......................... 2014 1 0521982

(51) Int. Cl.
*G06F 17/00* (2006.01)
*F21V 33/00* (2006.01)
(Continued)

(52) U.S. Cl.
CPC ......... *F21V 33/0056* (2013.01); *H04R 1/028* (2013.01); *H05B 33/0845* (2013.01);
(Continued)

(58) Field of Classification Search
CPC ............ F21V 33/0056; H05B 33/0845; H05B 33/0857; H05B 37/0272; H05B 37/029; H05B 37/038
See application file for complete search history.

(56) References Cited

U.S. PATENT DOCUMENTS

2013/0064386 A1* 3/2013 Yerrace .................. H04R 5/033 381/79
2013/0114826 A1* 5/2013 Chang .................... H04R 1/028 381/77
(Continued)

FOREIGN PATENT DOCUMENTS

CN 203099585 U 7/2013
CN 103298198 A 9/2013
(Continued)

OTHER PUBLICATIONS

The World Intellectual Property Organization (WIPO) International Search Report for PCT/CN2015/077797 dated Aug. 5, 2015.

*Primary Examiner* — Fan Tsang
*Assistant Examiner* — David Siegel
(74) *Attorney, Agent, or Firm* — Anova Law Group, PLLC

(57) ABSTRACT

A wirelessly-controlled lighting device and method with an audio playing function is provided. The wirelessly-controlled lighting device includes a lighting assembly, an audio playing module, a first Bluetooth module connecting with the lighting assembly and the audio playing module and a second Bluetooth module connecting with the audio playing module. The first Bluetooth module is configured to receive a control signal from an external device, the control signal including a first control signal used to control the lighting assembly and a second control signal used to control the audio playing module. The second Bluetooth module is configured to receive audio data from the external device to transmit the audio data to the audio playing module for audio playing. The audio playing is controlled according to the second control signal received by the first Bluetooth module.

10 Claims, 3 Drawing Sheets

(51) Int. Cl.

| | |
|---|---|
| ***H04R 1/02*** | (2006.01) |
| ***H05B 33/08*** | (2006.01) |
| ***H05B 37/02*** | (2006.01) |

(52) U.S. Cl.

CPC ..... *H05B 33/0857* (2013.01); *H05B 37/0272* (2013.01); *H05B 37/029* (2013.01)

(56) References Cited

U.S. PATENT DOCUMENTS

| | | | | |
|---|---|---|---|---|
| 2014/0286517 | A1 | 9/2014 | Luna et al. | |
| 2016/0142865 | A1 * | 5/2016 | Park | H04W 4/008 455/41.1 |

FOREIGN PATENT DOCUMENTS

| | | | |
|---|---|---|---|
| CN | 103697354 | A | 4/2014 |
| CN | 103712137 | A | 4/2014 |
| CN | 104296116 | A | 1/2015 |
| CN | 204141554 | U | 2/2015 |
| JP | 2006330708 | A | 12/2006 |
| KR | 10-2007-0113246 | A | 11/2007 |
| KR | 10-2013-0098932 | A | 9/2013 |
| KR | 20140100837 | A | 8/2014 |
| KR | 10-2014-0112900 | A | 9/2014 |
| WO | 2008084677 | A1 | 7/2008 |

* cited by examiner

WIRELESSLY-CONTROLLED LIGHTING DEVICE WITH AUDIO PLAYING FUNCTION AND CONTROL METHOD THEREOF

CROSS-REFERENCES TO RELATED APPLICATIONS

This application is a national stage application under 35 USC §371(c) of PCT Application No. PCT/CN2015/077797, entitled "Wirelessly-Controlled Lighting Device with Audio Playing Function and Control Method Thereof" filed on Apr. 29, 2015, which claims priority to Chinese Patent Application CN201410521982.9, filed on Sep. 30, 2014. The entire disclosure and contents of the above applications are hereby incorporated by reference herein.

FIELD OF THE INVENTION

The present disclosure generally relates to the field of lighting technology and, more particularly, relates to a wirelessly-controlled lighting device with an audio playing function and a method for wirelessly controlling the lighting device with the audio playing function.

BACKGROUND

Currently, lighting devices such as LED (light emitting diode) devices with an audio playing function may be wirelessly controlled by a user device with a Bluetooth function through Bluetooth technology. However, the user device can only adjust brightness of the lighting device through the Bluetooth technology, or can only control playing of music through the Bluetooth technology.

Conventional solutions to solve the above problems in the existing technologies may include the following. First, a 2.4G wireless module is added in the lighting device and a special remote controller for controlling the brightness using this 2.4G wireless module is provided. The specific remote controller can adjust the brightness of the lighting device and control the audio playing through the 2.4G wireless module. However, this solution is not as convenient as using the user device with the Bluetooth function. Once the specific remote controller is lost, the dimming and audio playing control functions cannot be invoked. Second, a Bluetooth module utilized in the lighting device with the audio playing function may have to be capable of supporting a large-capacity external flash drive. However, the Bluetooth module that supports a large-capacity external flash drive is often very expensive. Further, in order for smart phones using Internetwork Operating system (iOS) to control the lighting device, a control chip compatible with iOS needs to be added. This further increases the cost.

The disclosed lighting devices with audio playing function and methods for wirelessly controlling the lighting device with the audio playing function are directed to solve one or more problems set forth above and other problems in the art.

BRIEF SUMMARY OF THE DISCLOSURE

One aspect of the present disclosure includes a wirelessly-controlled lighting device with an audio playing function. The wirelessly-controlled lighting device includes a lighting assembly, an audio playing module, a first Bluetooth module connecting with the lighting assembly and the audio playing module and a second Bluetooth module connecting with the audio playing module. The first Bluetooth module is configured to receive a control signal from an external device, the control signal including a first control signal used to control the lighting assembly and a second control signal used to control the audio playing module. The second Bluetooth module is configured to receive audio data from the external device to transmit the audio data to the audio playing module for audio playing. The audio playing is controlled according to the second control signal received by the first Bluetooth module.

Another aspect of the present disclosure includes a method for wirelessly controlling a lighting device with an audio playing function. In the method, a first Bluetooth module receives a control signal from an external device. The control signal includes a first control signal used to control a lighting assembly and a second control signal used to control an audio playing module. The first Bluetooth module transmits the first control signal to the lighting assembly to control lighting and transmits the second control signal to the audio playing module. A second Bluetooth module receives audio data from the external device and transmits the audio data to the audio playing module. The lighting of the lighting assembly is adjusted according to the first control signal, and the audio playing of the audio data is controlled according to the second control signal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
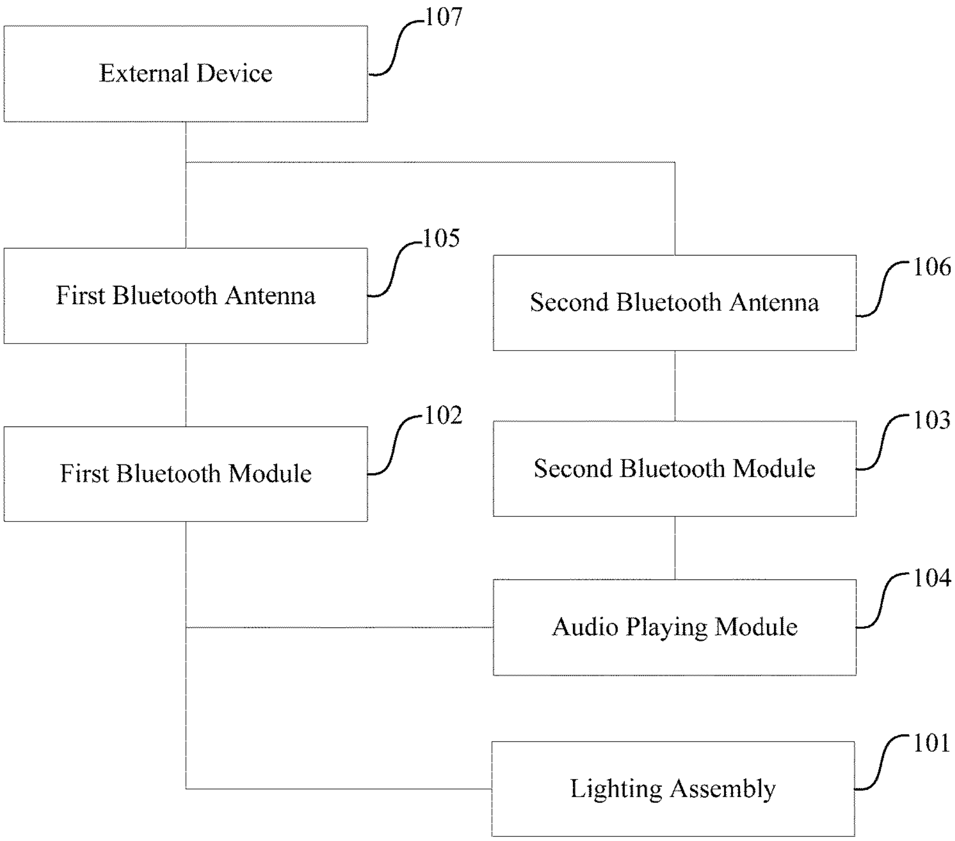
FIG. 1 illustrates a structure schematic diagram of an exemplary wirelessly-controlled lighting device with an audio playing function consistent with the disclosed embodiments of present disclosure.

FIG. 1 illustrates a structure schematic diagram of an exemplary wirelessly-controlled lighting device with an audio playing function consistent with the disclosed embodiments. As shown in FIG. 1, the wirelessly-controlled lighting device with the audio playing function may include a lighting assembly 101, a first Bluetooth module 102, a second Bluetooth module 103, and an audio playing module 104.

The first Bluetooth module 102 may be configured to receive a control signal from an external device 107. The control signal includes a first control signal and a second control signal. The first control signal is used to control the lighting assembly 101, and the second control signal is used to control the audio playing module 104. Specifically, the first control signal is used to control brightness of the lighting assembly 101, and the second control signal is used to control a playing status and/or playing volume of the audio playing module 104, e.g. to start, pause, stop, rewind, fast forward, skip, record, and/or repeat the audio data, and/or to adjust a volume of the audio playing.

The external device 107 may be a personal computer (PC) with a Bluetooth module, a mobile phone with a Bluetooth module, an audio player with a Bluetooth module, a tablet computer with a Bluetooth module, or any computing device with a Bluetooth module. Those skilled in the art should understand that the external device 107 disclosed herein is exemplary only. Other suitable devices may be included.

Specifically, the first Bluetooth module 102 may be a Bluetooth low energy (BLE) module, such as a BLE 4.0 module or a BLE 4.1 module. Compared with classic Bluetooth technology, BLE is intended to provide considerably reduced power consumption and cost, while maintaining a similar communication range.

In one embodiment that the BLE 4.0 module is used. When a plurality of wirelessly-controlled lighting devices with the audio playing function forms a network, the plurality of wirelessly-controlled lighting devices receive respectively the control signal from the external device 107 to individually control the lighting (according to the first control signal) and control the playing status/volume (according to the first control signal).

In one embodiment that the BLE 4.1 module is used. When a plurality of wirelessly-controlled lighting devices with the audio playing function forms a network, one of the plurality of wirelessly-controlled lighting devices may receive the control signal from the external device 107 and transmit the control signal to other wirelessly-controlled lighting devices through the BLE 4.1 module. In this manner, the lighting and playing status/volume of the other wirelessly-controlled lighting devices may be controlled according to the control signal transmitted from the one wirelessly-controlled lighting device.

The second Bluetooth module 103 may be configured to receive the audio data from the external device 107 and transmit the received audio data to the audio playing module 104.

Specifically, the second Bluetooth module 103 may be an Advanced Audio Distribution Profile (A2DP) Bluetooth module. The Advanced Audio Distribution Profile is a Bluetooth profile that allows for the wireless transmission of stereo audio from an A2DP source (e.g., a phone or computer) to an A2DP receiver (e.g., a wireless headset or stereo system).

The audio data received by the second Bluetooth module 103 and the control signal received by the first Bluetooth module 102 may be from the same external device, or may be from different external devices. In one embodiment, the audio data received by the second Bluetooth module 103 and the control signal received by the first Bluetooth module 102 are from the same external device.

The audio playing module 104 may be configured to, based on the second control signal received by the first Bluetooth module 102, play the audio data received by the second Bluetooth module 103. Other audio operations of the audio playing module 104 may include volume control and control to pause, stop, rewind, fast forward, skip, record, or repeat the audio data.

Optionally, the wirelessly-controlled lighting device with the audio playing function may also include a first Bluetooth antenna 105 and a second Bluetooth antenna 106.

The first Bluetooth module 102 may be configured to receive the control signal from the external device 107 through the first Bluetooth antenna 105. The second Bluetooth module 103 may be configured to receive the audio data from the external device 107 through the second Bluetooth antenna 106.

Figure 2:
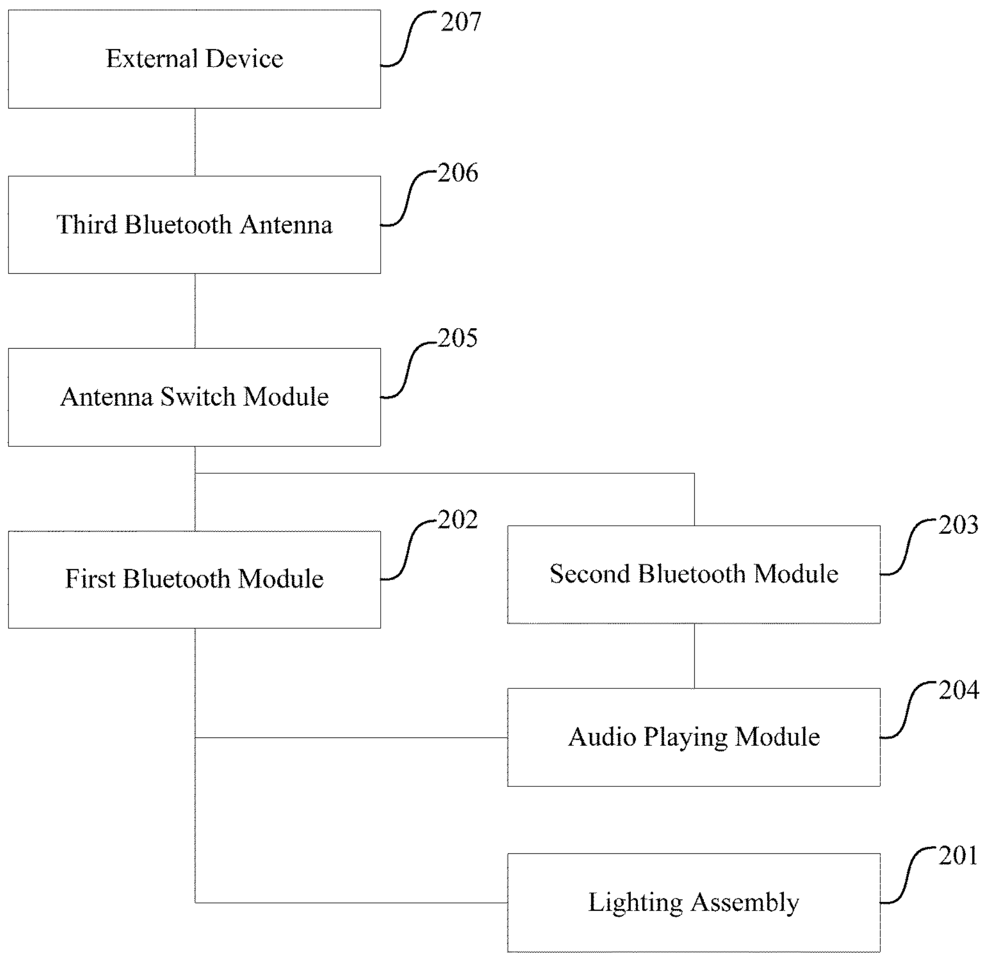
FIG. 2 illustrates a structure schematic diagram of another exemplary wirelessly-controlled lighting device with an audio playing function consistent with the disclosed embodiments of present disclosure.

FIG. 2 illustrates a structure schematic diagram of another exemplary wirelessly-controlled lighting device with an audio playing function consistent with the disclosed embodiments.

As shown in FIG. 2, the wirelessly-controlled lighting device with the audio playing function may include a lighting assembly 201, a first Bluetooth module 202, a second Bluetooth module 203, and an audio playing module 204. The lighting assembly 201, the first Bluetooth module 202, the second Bluetooth module 203 and the audio playing module 204 may be the same as or similar with the lighting assembly 101, the first Bluetooth module 102, the second Bluetooth module 103 and the audio playing module 104 shown in FIG. 1, respectively. In addition, the wirelessly-controlled lighting device shown in FIG. 2 may also include an antenna switch module 205 and a third Bluetooth antenna 206.

One end of the antenna switch module 205 is connected to the third Bluetooth module 206, and the other end of the antenna switch module 205 is connected respectively to the first Bluetooth module 202 and the second Bluetooth module 203. The antenna switch module 205 may be configured to connect alternatively the first Bluetooth module 202 and the second Bluetooth module 203 with the third Bluetooth antenna 206. That is, the first Bluetooth module 202 and the second Bluetooth module 203 can share the third Bluetooth antenna 206 through the antenna switch module 205 using time division multiplexing technique, thereby receiving the control signal or the audio data from an external device 207. Time division multiplexing (TDM) technique is used for transmitting two or more independent signals over a common signal path by dividing the time frame into slots, one slot for each signal. That is, each signal appears on the signal path only a fraction of time in an alternating pattern.

As disclosed, two Bluetooth modules are used in the wirelessly-controlled lighting device with the audio playing function. One Bluetooth module is only responsible for receiving the control signal (e.g., to individually or simultaneously control the lighting and the audio playing), and the other Bluetooth module is only responsible for receiving the audio data. Therefore, without using the Bluetooth module that has to be capable of supporting external flash drive with high capacity and without using the control chip that has to be compatible with IOS, the user device with the Bluetooth function can control both the lighting (e.g., brightness, color, etc.) of the lighting device and the audio playing according to the first control signal and the second control signal.

Figure 3:
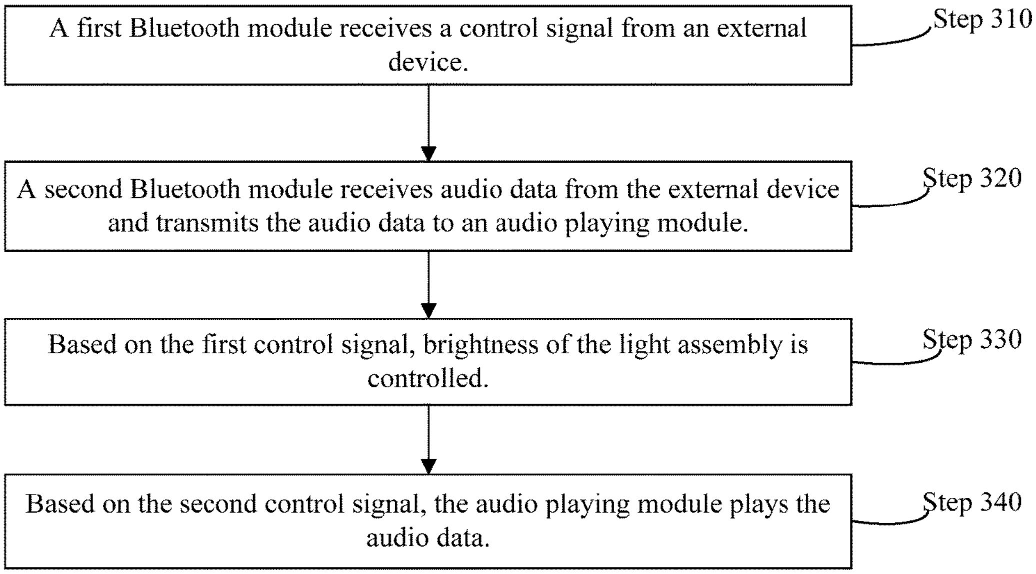
FIG. 3 illustrates a flow chart of an exemplary process for wirelessly controlling a lighting device with an audio playing function consistent with the disclosed embodiments of present disclosure.

FIG. 3 illustrates a flow chart of an exemplary process for wirelessly controlling a lighting device with an audio playing function consistent with various disclosed embodiments.

In Step 310: a first Bluetooth module receives a control signal from an external device. The control signal includes a first control signal used to control a lighting assembly and a second control signal used to control an audio playing module.

In Step 320: a second Bluetooth module receives audio data from the external device and transmits the audio data to an audio playing module.

Specifically, the control signal may be transmitted from the external device to the first Bluetooth module through a first Bluetooth antenna. The audio data may be transmitted from the external device to the second Bluetooth module through a second Bluetooth antenna.

Alternatively, the control signal and the audio data may be transmitted to the first Bluetooth module and the second Bluetooth module through a third Bluetooth antenna and an antenna switch module using time division multiplexing technique. One end of the antenna switch module is connected to the third Bluetooth module, and the other end of the antenna switch module is connected respectively to the first Bluetooth module and the second Bluetooth module. The antenna switch module is configured to connect alternatively the first Bluetooth module and the second Bluetooth module to the third Bluetooth antenna.

In Step 330: based on the first control signal, the lighting of a lighting assembly is controlled.

In Step 340: based on the second control signal, the audio playing module plays the audio data. Audio operations of the audio playing module may include: to start, pause, stop, rewind, fast forward, skip, record, or repeat the audio playing and may also include volume control.

For example, the lighting emitted from the lighting assembly may be controlled by adjusting brightness, color, and/or color temperature of light emitted from the lighting assembly. The lighting of the lighting assembly and the playing status/volume of audio data may be controlled together or independently. For example, while playing the audio data by the audio playing module, the lighting assembly may be controlled to gradually dim or gradually change color and/or color temperature of the emitted light at certain time points or after a certain period of time, according to background information associated with the audio data being played or according to a volume change of the audio data being played.

In another example, when a music or any specific auto data is being played, the lighting may be controlled accordingly. The lighting atmosphere may change according to the music style. For example, the lighting may flash or change color in accordance with beats of the music. The lighting outputted from the lighting assembly may be controlled according to or independently from the music being played.

Additionally, different playing status/volume of audio data may be controlled with respect to the lighting control. Different playing status may correspond to different lighting control. For example, after starting playing the audio data, the lighting may be controlled brighter and brighter. When the audio playing is paused, the lighting may be controlled flashing. When the audio playing is stopped, the lighting may be gradually dimmed. When the audio playing is being skipped, the lighting may change to a different color. When the audio playing is being fast forwarded, the lighting may change color quickly. When the audio playing is being repeated, the lighting may remain unchanged.

In some embodiments consistent with the present disclosure, a user may control the lighting and the audio broadcasting together or independently in an LED lighting/audio broadcasting device with an integrated audio playing modules. A user may change the audio feed to the audio playing module while sending control signals to the lighting assembly at the same time. Because the LED lighting/audio broadcasting device uses two blue tooth modules to receive control signals and audio feed respectively, these two types of user inputs can be sent and received simultaneously. These two types of user inputs do not need to be sent or received in sequence. There would be no delay in receiving the control signal and audio feed. For example, a user may change the music played through the audio playing module while he is dimming the light. The first blue tooth module may receive the control signal for dimming. The lighting assembly may then dim the lighting as requested. The second blue tooth module, at the same time, may change the music according to the audio feed received.

Further, the LED lighting device may present various lighting displays to indicate the operations of the two blue tooth modules as well as the operations of the audio playing module. For example, when the two blue tooth modules simultaneously receive two inputs (a control input and an audio input), the LED lighting device may change the light color or brightness for a short time to indicate the simultaneous reception of inputs. In another example, while the LED lighting is in the process of being dimmed (dimming control signal received from the first blue tooth module), the second blue tooth module may receive a new audio feed. The LED lighting device may present a short change in the lighting color or brightness to indicate the activities through the second blue tooth module.

Embodiments consistent with the present disclosure fully integrate the audio playing module with an LED lighting device and provide the capacities for a user to simultaneously control the system's lighting and audio function. The audio playing module, the first and second blue tooth modules and the first and second blue-tooth antennas may be designed to fit the body of the LED lighting device.

Those skilled in the art would further appreciate that the disclosed device and methods may be implemented using electronic hardware, computer software, or their combinations. To clearly illustrate this interchangeability of hardware and software, various illustrative modules and steps have been described above generally in terms of their functionality. Whether such functionality is implemented as hardware or software depends upon the particular application and design constraints imposed on the overall system. Skilled artisans may implement the described functionality in varying ways for each particular application, but such implementations should be interpreted within the scope of the present invention.

The method described in connection with the embodiments disclosed herein may be embodied directly in hardware, in a software module executed by a processor, or in a combination of the two. A software module may be configured in RAM memory, flash memory, ROM memory, EPROM memory, EEPROM memory, registers, hard disk, a removable disk, a CD-ROM, or any other form of storage medium known in the art. The processor and the storage medium may reside in an application-specific integrated circuit (ASIC).

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

In embodiments consistent with the present disclosure, two Bluetooth modules are used in a wirelessly-controlled lighting device with an audio playing function. One Bluetooth module may only be responsible for receiving a control signal; and the other Bluetooth module may only be responsible for receiving audio data. The user device with a Bluetooth function can control both the lighting of the lighting device and the audio playing in a desired manner. Further, embodiments consistent with the present disclosure do not need to use the Bluetooth module that supports external Flash drive with high capacity. Embodiments consistent with the present disclosure also do not need to use a control chip that is compatible with iOS.

What is claimed is:

1. A wirelessly-controlled lighting device with an audio playing function, comprising:

a lighting assembly;

an audio playing module;

a first Bluetooth module connecting with the lighting assembly and the audio playing module, wherein the first Bluetooth module is configured to receive a control signal from an external device, the control signal including a first control signal used to control the lighting assembly and a second control signal used to control the audio playing module;

a second Bluetooth module connecting with the audio playing module, and configured to receive audio data from the external device to transmit the audio data to the audio playing module for audio playing, wherein the audio playing is controlled according to the second control signal received by the first Bluetooth module;

a third Bluetooth antenna configured to receive the control signal and the audio data; and an antenna switch module having a first end connecting with the third Bluetooth antenna and having a second end respectively connecting with the first Bluetooth module and the second Bluetooth module, wherein the antenna switch module is configured to alternatively connect one of the first Bluetooth module and the second Bluetooth module with the third Bluetooth antenna for time-division multiplexing the third Bluetooth antenna for transmitting the control signal to the first Bluetooth module and for transmitting the audio data to second Bluetooth module.

2. The device according to claim 1, further including:

a first Bluetooth antenna, connected to the first Bluetooth module and configured to receive the control signal from the external device and transmit the control signal to the first Bluetooth module; and a second Bluetooth antenna, connected to the second Bluetooth module and configured to receive the audio data from the external device and transmit the audio data to the second Bluetooth module.

3. The device according to claim 1, wherein:

the first Bluetooth module is a Bluetooth low energy (BLE) module.

4. The device according to claim 1, wherein:

the second Bluetooth module is an Advanced Audio Distribution Profile (A2DP) Bluetooth module.

5. The device according to claim 1, wherein:

the external device is one of a personal computer with a Bluetooth module; a mobile phone with a Bluetooth module, an audio player with a Bluetooth module, and a tablet computer with a Bluetooth module.

6. A method for wirelessly controlling a lighting device with an audio playing function, comprising:

receiving, by a first Bluetooth module, a control signal from an external device, wherein the control signal includes a first control signal used to control a lighting assembly and a second control signal used to control an audio playing module;

transmitting, by the first Bluetooth module, the first control signal to the lighting assembly to control lighting;

transmitting, by the first Bluetooth module, the second control signal to the audio playing module;

receiving, by a second Bluetooth module, audio data from the external device;

transmitting, by the second Bluetooth module, the audio data to the audio playing module;

adjusting the lighting of the lighting assembly according to the first control signal;

controlling audio playing of the audio data, according to the second control signal; and receiving one of the control signal and the audio data, through a third Bluetooth antenna and an antenna switch module, wherein the antenna switch module has a first end connecting with the third Bluetooth antenna and has a second end respectively connecting h the first Bluetooth module and the second Bluetooth module using a time division multiplexing technique.

7. The method according to claim 6, further including:

receiving the control signal by the first Bluetooth module from the external device through a first Bluetooth antenna; and receiving the audio data from the external device by the second Bluetooth module through a second Bluetooth antenna.

8. The method according to claim 6, wherein:

the first Bluetooth module is a Bluetooth low energy (BLE) module.

9. The method according to claim 6, wherein:

the second Bluetooth module is an Advanced Audio Distribution Profile (A2DP) Bluetooth module.

10. The method according to claim 6, wherein:

the external device is one of a personal computer with a Bluetooth module, a mobile phone with a Bluetooth module, an audio player with a Bluetooth module, and a tablet computer with a Bluetooth module.

* * * * *